United States Patent
Parker et al.

(10) Patent No.: US 6,415,984 B1
(45) Date of Patent: *Jul. 9, 2002

(54) AUTOMATIC OCCUPANCY AND TEMPERATURE CONTROL FOR CEILING FAN OPERATION

(75) Inventors: Danny S. Parker, Cocoa Beach, FL (US); Kendall Ryan Johnston, Santa Clara, CA (US)

(73) Assignee: University of Central Florida, Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/711,599

(22) Filed: Nov. 13, 2000

Related U.S. Application Data

(60) Division of application No. 09/415,883, filed on Oct. 8, 1999, now Pat. No. 6,189,799, which is a division of application No. 09/067,236, filed on Apr. 27, 1998, now Pat. No. 5,996,898, which is a continuation-in-part of application No. 09/056,428, filed on Apr. 7, 1998, now Pat. No. 6,039,541.

(51) Int. Cl.⁷ ............................. F24F 7/00; G05D 23/00
(52) U.S. Cl. ........................ 236/49.3; 236/51; 417/14
(58) Field of Search ................. 236/49.3, 51; 454/229, 454/256; 417/14, 18

(56) References Cited

U.S. PATENT DOCUMENTS

| | | | |
|---|---|---|---|
| 4,322,632 A | 3/1982 | Hart et al. | 307/41 |
| 4,671,458 A | 6/1987 | Fukuda et al. | 236/49 |
| 4,716,409 A | 12/1987 | Hart et al. | 340/825.22 |
| 4,757,204 A | 7/1988 | Baldwin et al. | 250/342 |
| 4,787,722 A | 11/1988 | Claytor | 350/452 |
| 4,849,737 A | 7/1989 | Kirhata et al. | 340/567 |
| 4,990,908 A | 2/1991 | Tung | 340/825.63 |
| 5,033,113 A | 7/1991 | Wang | 455/603 |
| 5,124,566 A | 6/1992 | Hu | 307/116 |
| 5,187,472 A | 2/1993 | Hart et al. | 340/825.69 |
| 5,189,393 A | 2/1993 | Hu | 340/522 |
| 5,197,858 A * | 3/1993 | Cheng | 417/14 |
| 5,372,545 A | 12/1994 | Noda et al. | 454/256 |
| 5,406,173 A | 4/1995 | Mix et al. | 315/156 |
| 5,449,275 A * | 9/1995 | Gluszek et al. | 417/18 X |
| 5,488,273 A | 1/1996 | Chang | 318/16 |
| 5,511,943 A | 4/1996 | Chang | 416/5 |
| 5,559,406 A | 9/1996 | Chang | 315/322 |
| 5,627,527 A | 5/1997 | Mehta | 340/825.06 |
| 5,637,040 A | 6/1997 | Kim et al. | 454/256 |
| 5,996,898 A | 12/1999 | Parker et al. | 236/51 |
| 6,039,541 A * | 3/2000 | Parker et al. | 416/223 R |
| 6,189,799 B1 * | 2/2001 | Parker et al. | 236/51 |

FOREIGN PATENT DOCUMENTS

| | | | | |
|---|---|---|---|---|
| GB | 2260830 A | 4/1993 | | |
| JP | 401023045 A | 1/1989 | | 454/229 |
| JP | 404098032 A | 3/1992 | | 454/229 |
| JP | 405010562 A | 1/1994 | | 454/229 |
| JP | 406002902 A | 1/1994 | | 454/229 |
| JP | 406174274 A | 6/1994 | | 454/229 |

* cited by examiner

*Primary Examiner*—William Wayner
(74) *Attorney, Agent, or Firm*—Brian S. Steinberger; Law Offices of Brian S. Steinberger, PA

(57) ABSTRACT

Ceiling fan operation control for turning the fan on and off based on a passive infrared sensor, combined with a temperature sensor to regulate, the speed of the fan. The passive infrared sensor, the temperature sensor and controls for both are in a housing directly mounted to the fan motor of the ceiling fan. Me controls can be set screws covered by a removable cap. The passive if sensor can include a fresnal lens for sensing a 360 degree circumference beneath the fan, and a photo-optical sensor such as a photocell, which suspends ceiling fan control changes for allowing the fan to continue operation when the room is dark and occupants may be sleeping.

15 Claims, 9 Drawing Sheets

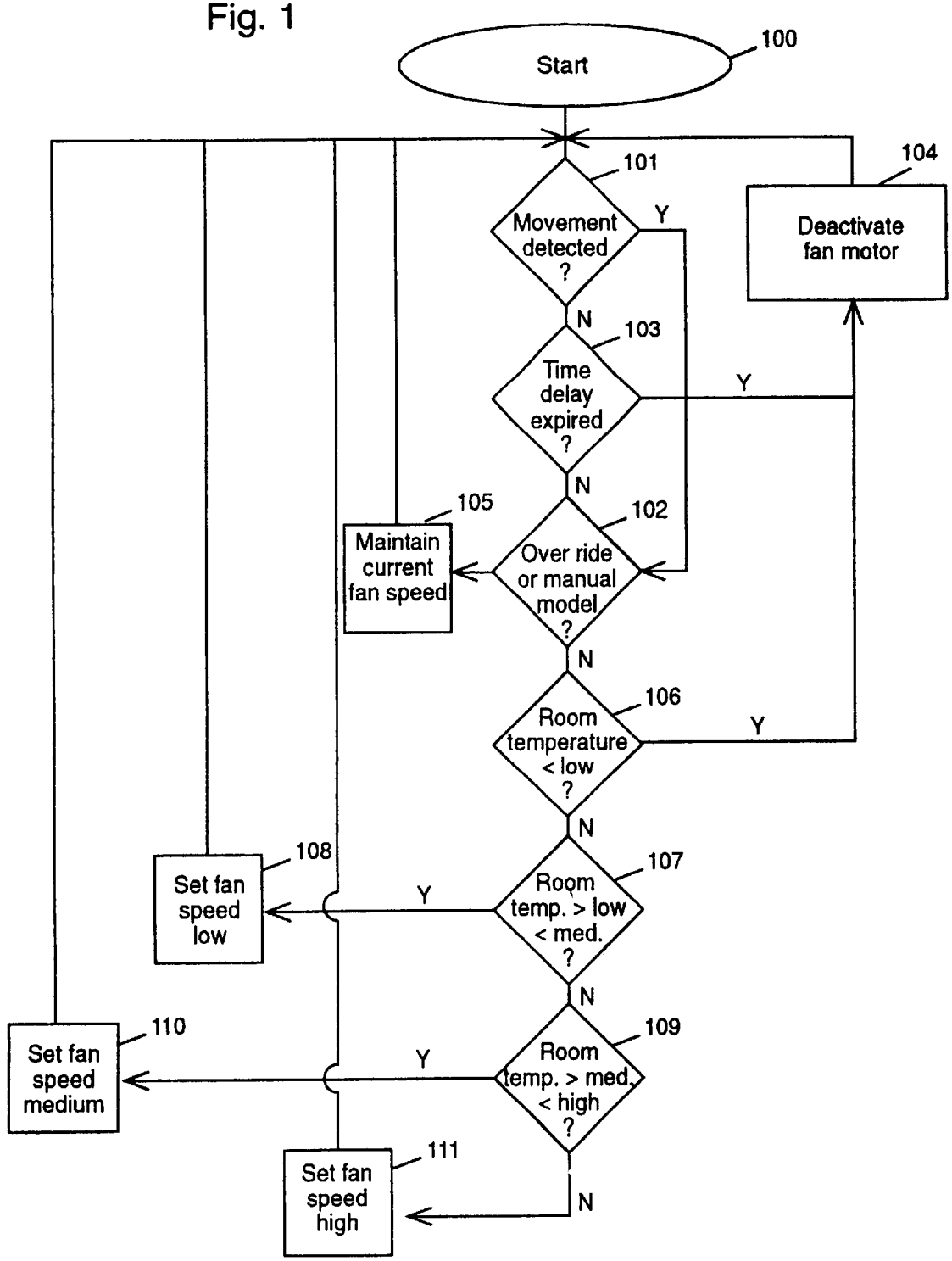

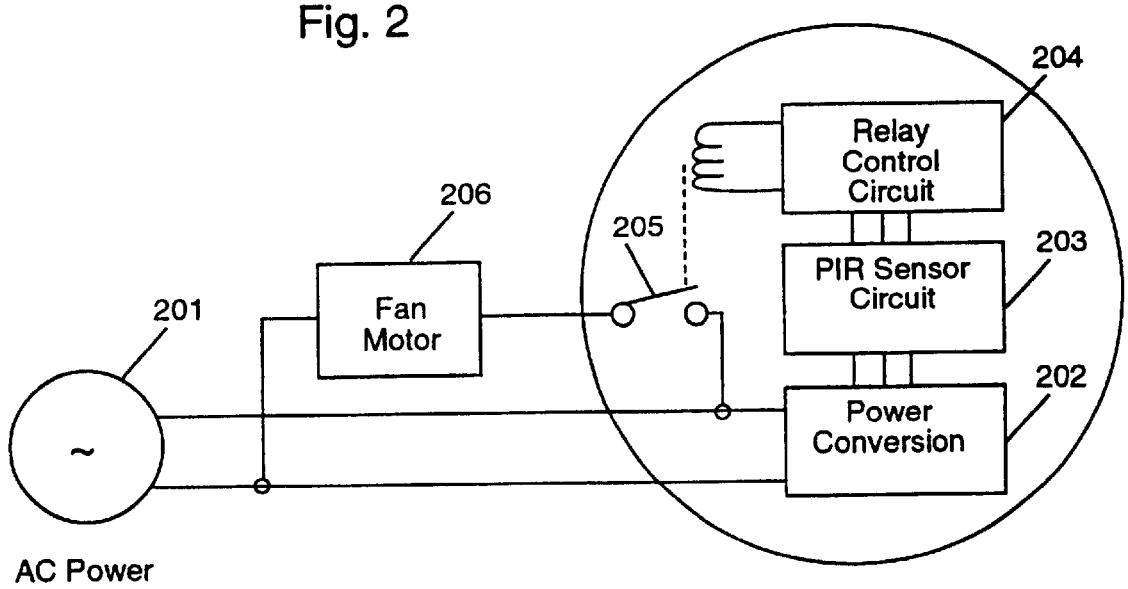
Occupancy Ceiling Fan Control

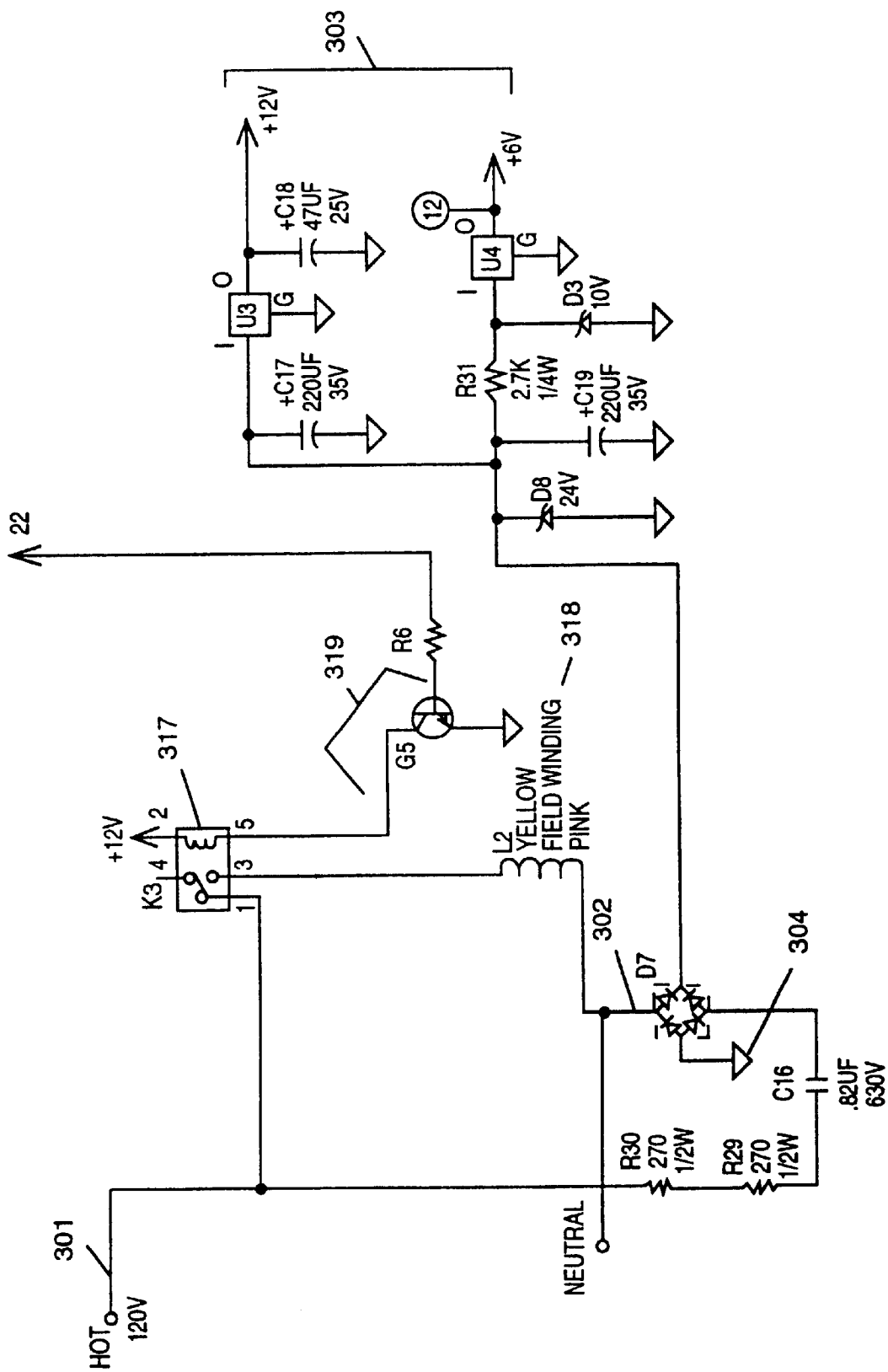

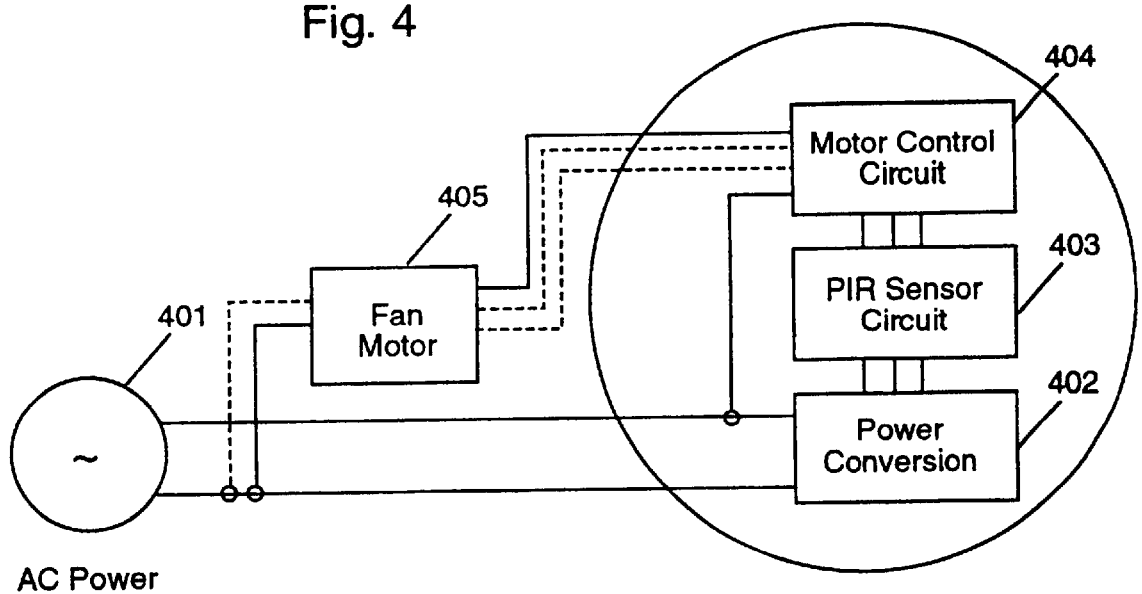
Occupancy/Temperature Ceiling Fan Control

AUTOMATIC OCCUPANCY AND TEMPERATURE CONTROL FOR CEILING FAN OPERATION

This is a Divisional of Application Ser. No. 09/415,883 now U.S. Pat. No. 6,189,799 filed Oct. 8, 1999 which is a divisional of Ser. No. 09/067,236 filed Apr. 27, 1998, now issued as U.S. Pat. No. 5,996,898.

This invention relates to ceiling fan controls, and in particular to an automatic occupancy and temperature control for ceiling fan operations. This application is a Continuation-In-Part of U.S. Patent application Ser. No. 9,056,428, filed on Apr. 7, 1998, U.S. Pat. No. 6,039,541 entitled: High Efficiency Ceiling Fan, by the same assignee.

BACKGROUND AND PRIOR ART

Overhead ceiling fans have become very popular over in recent years. Problems have developed as to the operations of the fans. For example, traditional fans are often left on when occupants leave rooms with overhead ceiling fans. Thus, the fans can consume unnecessary power in unoccupied rooms. Another problem occurs when newly arriving occupants to new rooms and/or to darkened rooms have to search for hard to find wall toggle switches and/or overhanging chains to turn on the ceiling fans. Warm and/or stuffy rooms can be very uncomfortable to newly arriving occupants, who would have to wait for the rooms to cool down and circulate airflow. Further, turning on and off several fans in a home or building is often so inconvenient that fans are left on.

In prior art searches several patents were cited as of general interest in the art, but still fall to overcome the problems cited above.

U.S. Pat. No. 4,322,632 to Hart et al. describes a "remote load selector", title, that allows for both a ceiling fan motor and a built-in light fixture to be selectively controlled from a single two-conductor hardwire cable connection.

U.S. Pat. No. 4,671,458 to Fukuda et al. describes an "air conditioning apparatus", title, that senses temperatures via an infrared sensor to vary the air conditioner air flow pattern rather than to modify the fan motor speed of a ceiling fan.

U.S. Pat. No. 4,716,409 to Hart et al. describes an "electrical appliance control system" which manually activates a ceiling fan from a remote controlled oudet.

U.S. Pat. No. 4,757,204 to Baldwin et al. describes a ceiling mounted passive infrared intrusion detector with a dome shaped lens.

U.S. Pat. No. 4,787,722 to Clayto describes a Fresnel lens capable of transmitting infra-red energy rays.

U.S. Pat. No. 4,782,213 to Teal describes a "ceiling fan electrically heating environmental air" where the devices heats the air in a room by resistance heaters located on the fan blades, which are activated by a thermostat.

U.S. Pat. No. 4,849,737 to Kirihata et aL describes a "person-number detecting system" for using inared sensors to detect the numbers of people per room U.S. Pat. No. 4,990,908 to Tung describes a "remote power control for dual loads" for supplying power to a ceiling fan and light kit.

U.S. Pat. No. 5,033,113 to Wang describes an "Infrared Receiver System For A Remote Control Ceiling Fan", title. The Wang devices describes an attachment device for positioning a infrared sensor beneath the fan for receiving an i signals for a remote control ceiling fan.

U.S. Pat. No. 5,124,566 to Hu describes a shutoff circuit for a light sensor controlled switch.

U.S. Pat. No. 5,187,472 to Hart et al. describes a "remote control system for combined ceiling fan and light fixture", title using a wall mounted thermostat to send radio signals to alter fan speed and energization.

U.S. Pat. No. 5,189,393 to Hu describes a combination type sensor using both passive in ared(PIR) and ultrasonic sensing, as an automatic sensor controlled switch that can detect motion in a room to turn on or off lights, for instance.

U.S. Pat. No. 5,406,173 to Hu describes an occupancy sensor that senses ambient light levels to control the dimming of lights.

U.S. Pat. No. 5,488,273 to Chang describes a "ceiling fan and light assembly control method", title, using a sounding detector to turn on and off a ceiling fan and light kit U.S. Pat. No. 5,511,943 to Chang describes a "single throw switch circuit controlling a ceiling fan" that controls ceiling fan speed using a manual switch.

U.S. Pat. No. 5,559,406 to Chang describes a "ceiling fan and light assembly control circuit with remote controller/single-throw switch optional controls" that uses an infrared remote sending unit to send a signal to a receiving unit.

U.S. Pat. No. 5,627,527 to Mehta describes a "thermostatically controlled remote control for a ceiling fan and light" using household wiring to send signals to alter fan speed U.S. Pat. No. 5,637,040 to Kim et al. describes an "infrared object detector" that uses an infrared sensor to detect the distance between persons and an air conditioner to adjust air conditioner fan speed and baffled air direction.

None of the cited patents adequately and sufficiently overcome the problems previously described above, particularly the problem of ceiling fans being inadvertently left on for long periods of time when no one is present.

SUMMARY OF THE INVENTION

The first objective of the present invention is to provide a ceiling fan control system using an infrared sensor to detect room occupants to turn the fan on and off.

The second object of this invention is to provide a ceiling fan system to sense room temperature in order to vary the speed(revolutions per minute(rpm)) of the ceiling fan.

The third object of this invention is to provide a ceiling fan system control for on and off operation and speed control which is directly attached to the ceiling fan housing.

The fourth object of this invention is to provide a ceiling fan system, particularly the problem of ceiling fans that eliminates inadvertently leaving the fans on for long periods of time when no one is present.

The fifth object of this invention is to provide a ceiling fan control system that can sense occupants across a wide 360 degree field for operating the fan.

The sixth object of this invention is to provide a ceiling fan control system that can suspend motion control during hours of darkness when occupants are sleeping.

A preferred embodiment of the invention includes a housing that mounts onto a ceiling fan itself generally in the location of where lights can be attached to the motor housing. The housing includes an infrared passive(PIR) sensor and adjustable control for turning the fan on and off based on motion of person(s) approaching and leaving a selected area beneath the fan, a time delay potentometer and adjustable control for turning the fan off after a preselected period when no motion is sensed, and temperature sensor and adjustable controls for varying speed of the fan based on preselected temperatures. A photocell on the housing senses light to allow the fan to operate when the area beneath the fan is dark. A removable cap covers the controls for high and low temperature settings and time settings for operation. The cap cover has a fresnel lens that covers the PIR sensor underneath, and a temperature sensor protrudes from a slot in the cover.

With the cap off, a Phillips head screw driver can be used to set the temperature and time settings with the cap cover off. A first temperature setting screw can turn the fan off when sensed temperature is below a first preselected temperature. A second temperature setting screw having a second preselected temperature greater than the first preselected temperature, can be used to turn the fan on to a first rotation speed when the sensed temperature is between the first preselected setting and a halfway point to the second preselected setting. With the temperature setting screws, the fan turns to a second rotation speed when the sensed temperature is greater than the halfway point to the second preselected setting, and the fan turns to a third rotation speed when the sensed temperature is greater than the second preselected setting. On the fan the third rotation speed of the moving blades is greater than the second rotation speed which is greater than the first speed.

For the control of ceiling fans it is advantageous to achieve different attributes for an occupancy based control. Additional benefits of the subject invention are the ability to sense occupants across a wide 360 degree field, the ability to suspend motion control during hours of darkness when occupants are sleeping, and the ability to automatically vary ceiling fan speed with the room air temperature. Ultrasonic type occupancy sensors are not appropriate since ceiling fan motion would induce false triggering of the device. Automatic controls which can dim lights in response to available daylight are not appropriate to ceiling fan control since motor speeds should ideally be altered in response to temperature rather than ambient light.

Further objects and advantages of this invention will be apparent from the following detailed description of a presently preferred embodiment which is illustrated schematically in the accompanying drawings.

BRIEF DESCRIPTION OF THE FIGURES

FIG. 1 is a flow chart of the overall operation of the novel ceiling fan control system.

FIG. 2 shows a block diagram of the fan control with an occupancy-only based control unit, that turns the fan on/off with respect to sensed occupancy, but does not alter a manually set fan speed.

FIG. 4 shows a block diagram of the fan control with both occupancy and temperature based fan motor speed control, which will turn the fan on and off based on sensed occupancy and will alter the fan motor's operating speed based on sensed temperature.

DESCRIPTION OF THE PREFERRED EMBODIMENT

Figure 3A:
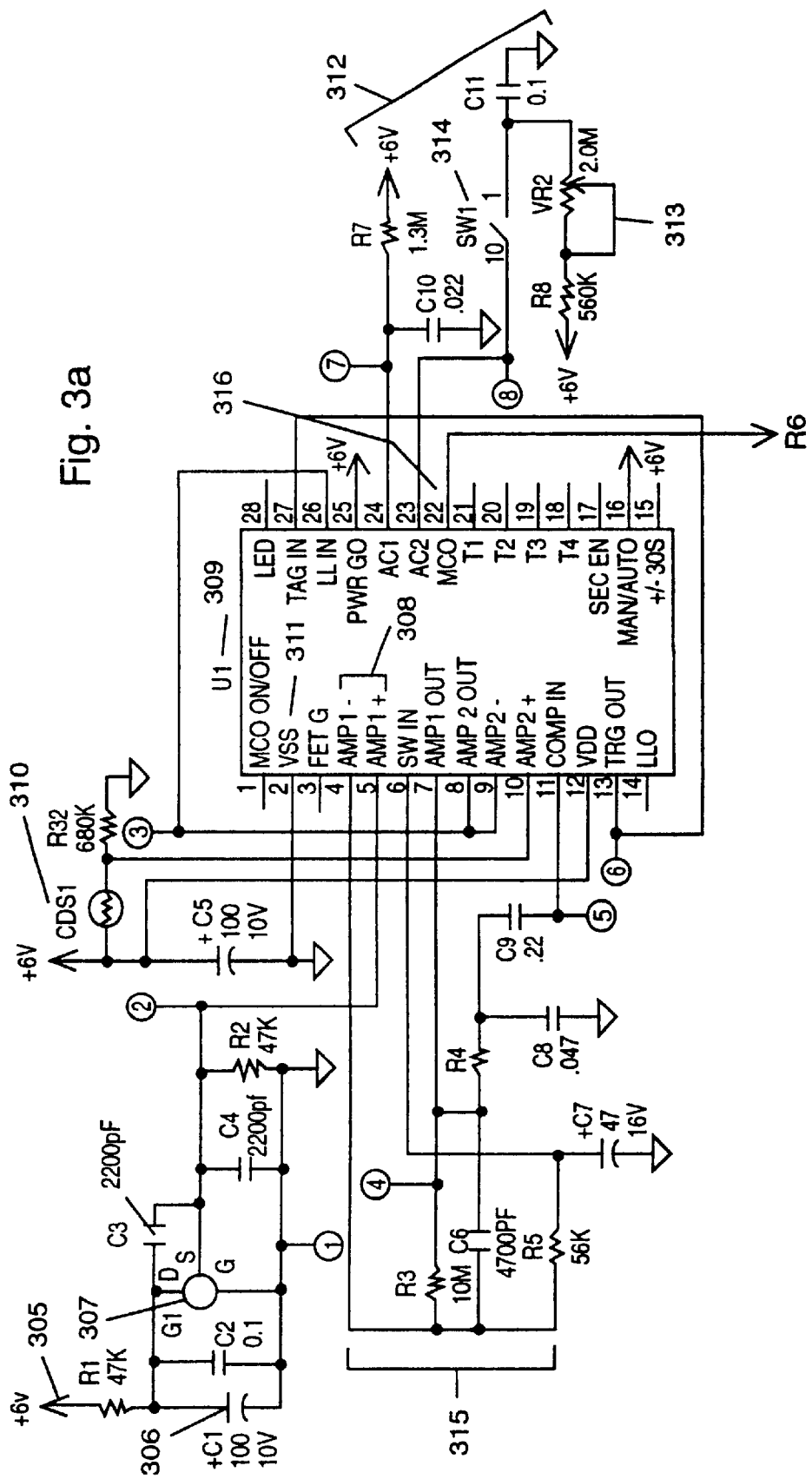
FIG. 3 shows a schematic circuit of the occupancy sensing portion of the control system of FIG. 2.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

The novel ceiling fan control system of the subject invention was tested at the Florida Solar Energy Center® (FSEC®). FIG. 1 is a flow chart of the overall operation of the novel ceiling fan control system.

A preferred operation of the novel ceiling fan control is described in the flow chart shown in FIG. 1, which gives an overview of the function of the schematics shown in greater detail in reference to FIGS. 2–5. The control system sequence begins to operate when electrical power is applied to the novel control 100. The passive infrared (PIR) sensing detector immediately begins to scan through a 360 degree compound fresnel lens. The Detector senses movement within its field of view at state 101, it checks to see if a manual override has been set or the control does not sense thermal conditions 102. If the PIR sensors does not detect movement, it checks to see if the set time delay is expired 103. If the time delay has expired, the control switches off the fan motor 104. If, the time delay has not expired, the control checks to see if manual override has been set or the control unit does not include temperature based speed control 102 (the invention can be used and only manufactured with an occupancy-based control and without a temperature based control). If the override is specified or the unit is an occupancy sensing only model, it maintains the current ceiling fan speed at state 105. If manual override is not set (or the control unit does not include temperature based speed control), the control checks to see if the room temperature is below the minimum setting 106. If room temperature is below the setting, the control deactivates the fan motor 104. Otherwise, the control checks to see if the temperature is greater than the low setting and less than the mid-point between the high and low setting at state 107. If this is true, the control sets the fan speed to low speed 108. If the temperature is equal to or greater than the mid point of the set range, the control determines whether the temperature is less than the high temperature set 109. If it is not, the control sets the fan motor to medium speed 110. If the temperature is grear than the high speed value, the fan is set to high speed at state 111. The entire sequence of FIG. 1 is repeated as long as the fan control is powered.

Figure 5A:
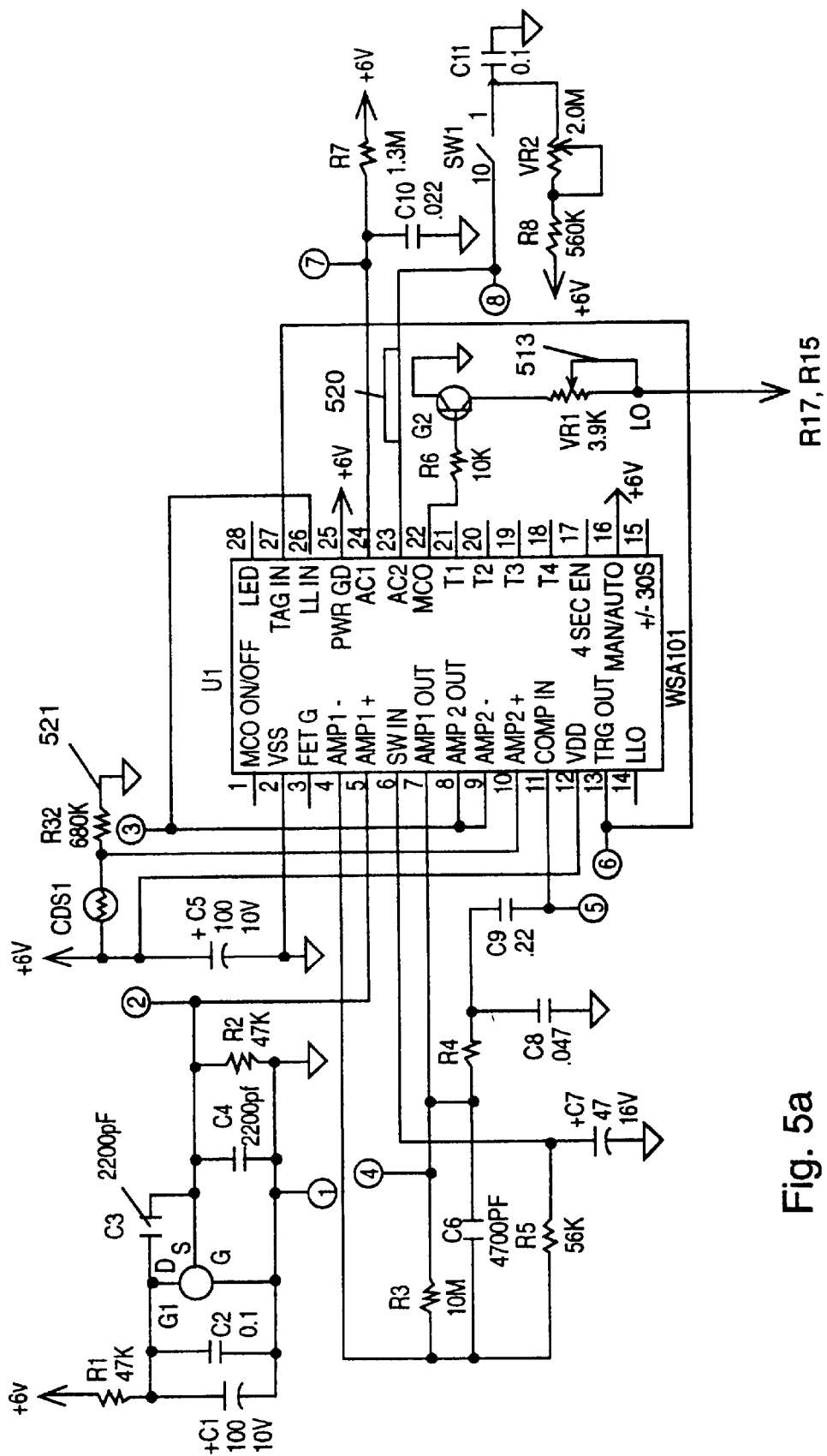
FIG. 5 is a schematic circuit of the thermal condition speed control portion of the fan control system of FIG. 4.
Figure 5B:
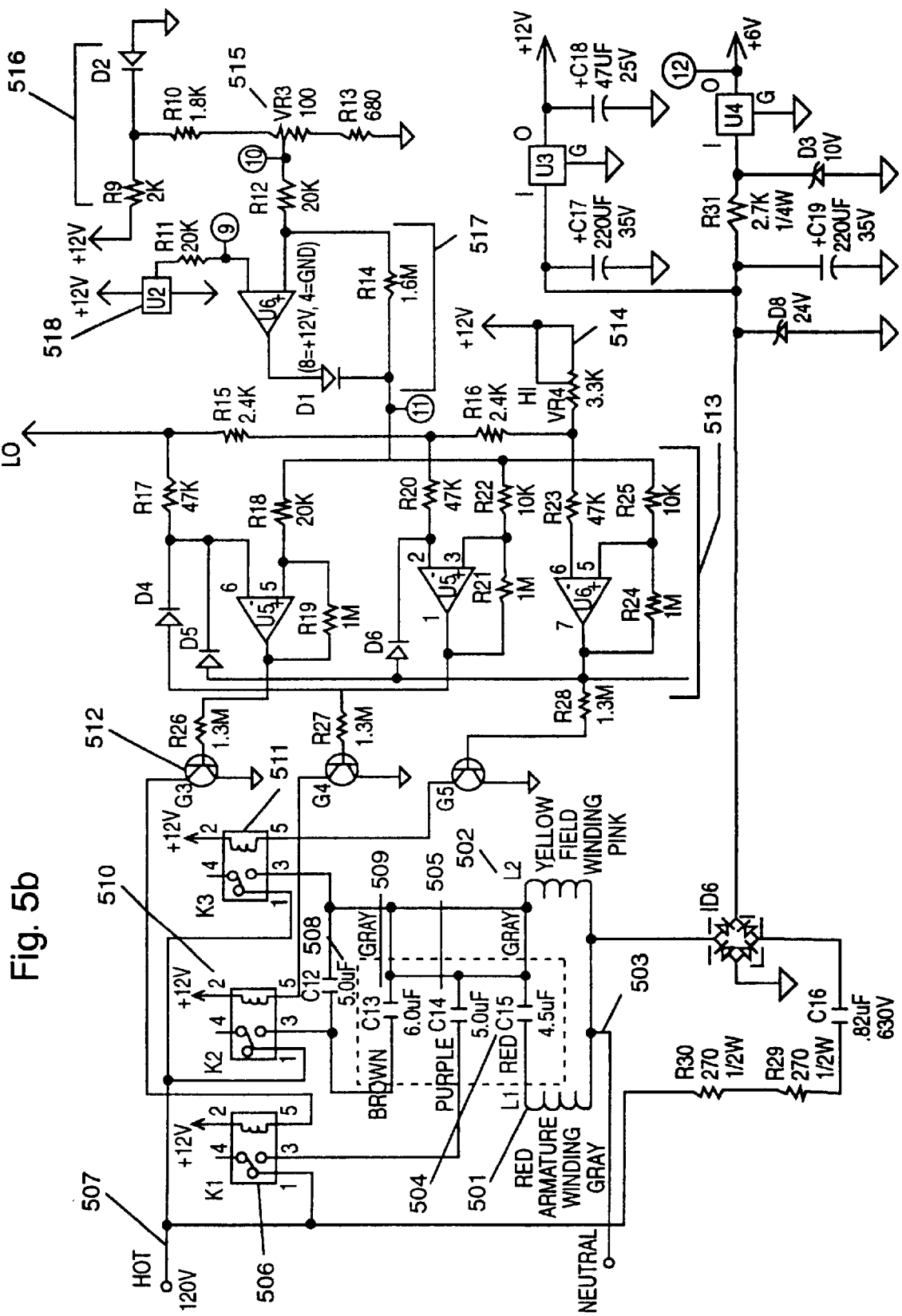

The ceiling fan control system is generally illustrated in FIGS. 2 and 4 with a detailed description of the circuit schematics shown and described in reference to FIGS. 3 and 5.

FIG. 2 shows a block diagram of the fan control with an occupancy-only based control unit, that turns the fan on and off with respect to sensed occupancy, but does not alter a manually set fan speed. AC power 201 such as that coming from a 120 volt wall power supply provides electricity to a DC conversion circuit 202. The power conversion circuit 202 energizes the passive infrared sensing detector 203. Based on the state of the occupancy sensing, and the set time delay(for example, approximately 15 seconds to approximately 30 minutes), a signal is provided to a relay control circuit 204. The control of the time set delay will be described in greater detail in reference. to FIG. 7. When occupancy is sensed or a time delay from a previous sensing has not expired, the relay completes a switch 205 providing power to the ceiling fan motor 206.

FIG. 3 shows a schematic circuit of the occupancy sensing portion of the control system.

The present invention depicts a shutoff control for a sensor controlled switching apparatus designed specifically to control ceiling fans. 120 volts of AC power 301 comes into the power supply and is transformed and regulated using regulators D3 and U2 to provide 24 volts 302 and 6 volts 303 DC out. All grounds through-out the diagram (upside down open arrow) are tied to the power supply ground 304. Power is provided 305 to the biasing network 306 which includes capacitors C1 to C4 and Resistors R1 and R2. The passive infrared sensor Q1 307 provides its output to Ampl 308 on U1, the Application Specific Integrated Circuit (ASIC) 309. A photocell (CDS1)310 senses light and provides output to VSS on the ASIC. An oscillator circuit 312 consisting of R8, C9 provides output to RC1 on the ASIC to operate the circuit clock A trim potentiometer circuit VR2 and R8 313 is used to allow adjustment of the PIR sensing time delay. This is an innovation in the circuit to reduce the cost. Thus, the sensitivity adjustment circuits that were required on Prior art U.S. Pat. No. 4,820,938 to Mix et al. and U.S. Pat. No. 5,124,566 to Hu, have been eliminated in interest of inexpensive manufacture. Manual override of PIR control is provided by a switch 314. An amplifier circuit 315 consisting of C10, C11 and Resistors R7 provide signal conditioning as selections from the trim adjustments and switches feed into the ASIC board. This integrated circuit 309 processes the various signals and switch selections to determine the status of the Motion Control Output (MCO) 316 which consists of a relay 317 which urns on and off the fan motor 318 based on conditions of using the occupancy sensing-and the time delay. Q5 and R6 315 energize the relay coil to turn on and off the fan. A unique feature is that if the photocell 310 senses light, it will allow the occupancy output to be altered; without light it will not alter its final state until light is again sensed. This prevents the fan from being turned off in bedrooms while motionless occupants are sleeping. Other innovations in the circuit includes changes to the power supply 302–304, so that AC power can be used which reduce its size and cost of manufacture, deletion of LED test output and substitution of a trim potentiometer for dip switches all configured to reduce the size of components to fit on a ceiling fan control housing and to reduce the cost of manufacturing.

FIG. 4 shows a block diagram of the fan control with both occupancy and temperature based fan motor speed control, which will turn the fan on and off based on sensed occupancy and will alter the fan motor's operating speed based on sensed temperature. 120 Volt AC power 401 provides electricity to a DC conversion circuit 402. The power conversion module energizes the passive infrared sensing mechanism 403. Based on the state of the occupancy sensing, and the set time delay, a signal is provided to the motor control circuit 404. Occupancy sensing can be activated or turned off using a two-position override toggle type switch and the time delay can be set with a Phillips head screwdriver, both of which are shown and described in greater detail in reference to FIG. 7.

Figure 7:
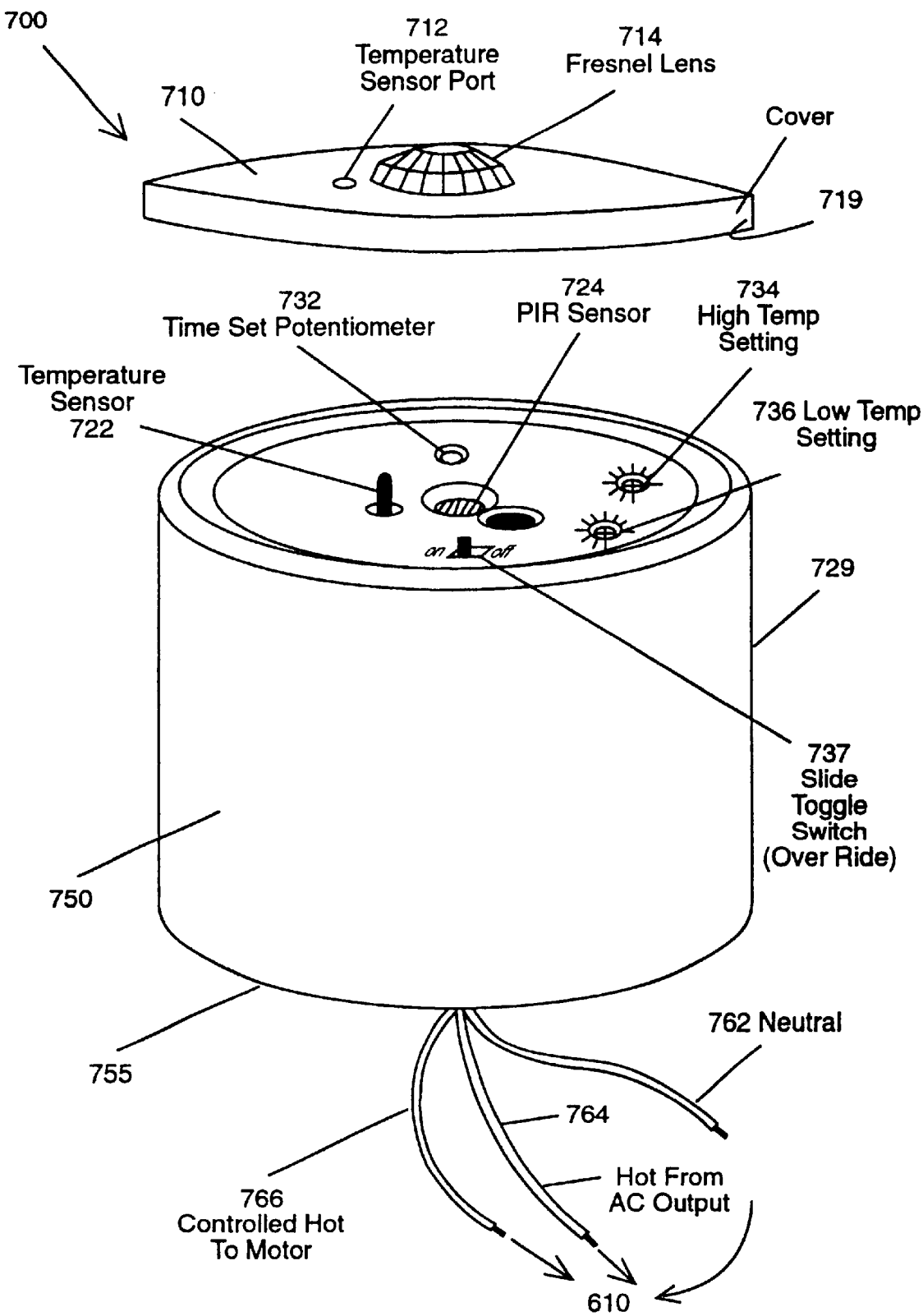
FIG. 7 is an enlarged side view showing the components of the previous figures mounted into a housing 700 that attaches to a motor housing of a ceiling fan shown in FIG. 6 with the controls mounted therein for setting temperature, time, and occupancy.

Referring to FIG. 4, when occupancy is sensed or the time delay from previous sensing has not expired and sensed temperature is greater than the lower limit set, the motor control circuit 404 provides power to the ceiling fan motor 405 and adjusts fan speed based on sensed temperature conditions which are shown and described in more detail in reference to FIG. 7.

FIG. 5 is a schematic circuit of the thermal condition speed control portion of the fan control system. The armature winding (L1, 501) and the field winding (L2, 502) of the fan motor(405 FIG. 4) are each connected to the AC line (Neutral 503). The other side of L1 is connected to capacitor C4 504. The other side of C4 connects to one side of L2 noted as Node A The line voltage is connected to Node A through C5 505 when relay K1 506 is energized. Positive 507 is connected to Node A through parallel combination of C1 508 and C6 509 when K2 510 is energized. Positive is connected to Node A directly when K3 511 is energized. Relays K1 506, K2 510 and K3 511 are enabled by the occupancy sensor control circuit (see FIGS. 2 and 3) when occupancy is detected A solid state temperature sensing semi-conductor S18 reads the air temperature just outside the control surface. None of the relays (K1 506, K2 510, K3 511) are energized except for 512, if the temperature is less than 74° F. K1 506 is energized when the sensed temperature is greater than or equal to 74° F. and less than 77° F. K2 510 is energized if the temperature is greater than or equal to 77° F. and is less than 80° F Relay K3 511 is energized if the sensed temperature is greater than 80° F. The large circuit shown as 513 provides an analogue to digital conversion for the temperature signal The trim potentiometer 514, allows adjustment of the temperature control high setting, while VR1 519, allows control of the low setting. The reference voltage for the temperature sensor is supplied by R9 and D2 516, while VR3 515, allows calibration of the temperature reading. The solid state device Q2 and resistor R6 520, enables the analogue to digital converter. The light sensing mechanism 521 allows suspensionof the control being changed during darkness. The unmarked remainder of the circuit is identical to FIG. 3.

Figure 6:
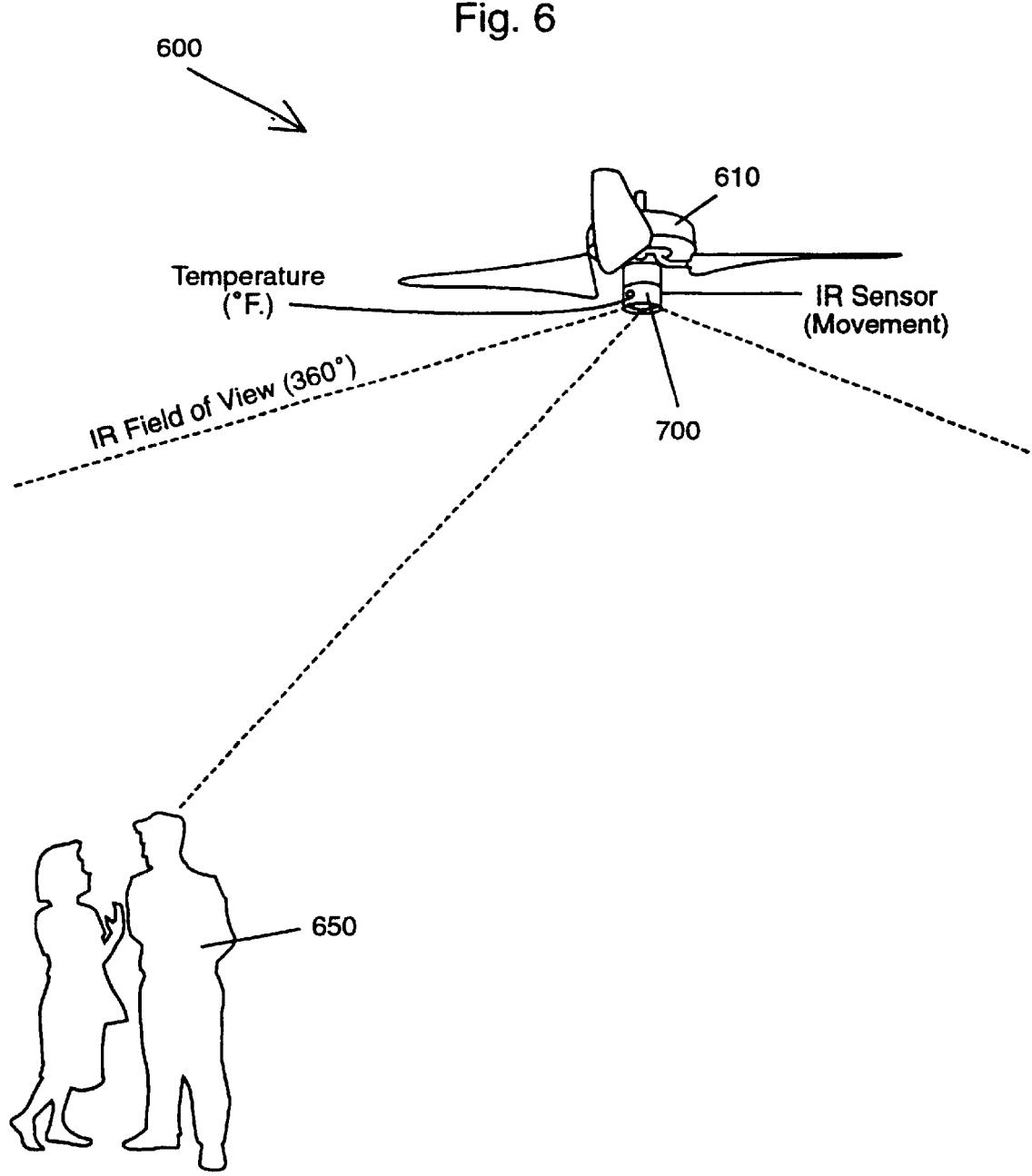
FIG. 6 shows a preferred embodiment of using the ceiling fan control system with an overhead ceiling fan.

FIG. 6 is a preferred embodiment 600 of using the ceiling fan control system 700 with an overhead ceiling fan 610 motor and fan blades, wherein sensed occupants 650 can operate the fan and temperatures can be used to activate and deactivate fan operation.

FIG. 7 is an enlarged side view showing the components of the previous figures mounted into a housing 700 that attaches to a motor housing of a ceiling fan shown in FIG. 6 with the controls mounted therein for setting temperature, time, and occupancy. The IR sensor 724 can be a PIR cell model no. RE200B manufactured by NICERA.

Referring to FIG. 7, the housing 750 holding the invention can be attached to an existing motor mount on a ceiling fan system that has a light kit attachment capability, such as but not limited to using a raised ridge 755 with internal threads to mount the housing to the motor (610 shown in FIG. 6). The cap cover 710 which protrudes from the lower part of the housing 700 when mounted, has a fresnel lens 713 that covers the PIR sender 724 underneath, and a slot/port 712 for allowing the elongated temperature sensor 722 to protrude therefrom. The cap cover 710 can be attached to tie main housing 750 by fasteners such as but not limited to mateable these 719, 729, respectively. The temperature setting can be accomplished by adjusting Phillips head screws 734 and 736 which set the high and low temperatures for the invention. The high setting 734 can be adjusted to turn the fan on, for example to 78 degrees at which the fan blades will be set to rotate on. The low temperature setting 736 is the setting at which the fan will turn off, for example 70 degrees.

Referring to FIG. 7, the operation of the temperature set screws 734, 736 will know be described. Set screw 734 determines the temperature at which the fan will be set to maximum speed. Turning set screw 734 to its fully counterclockwise position sets the high temperature setting to its maximum 90F; setting screw 734 to fully clockwise sets it to its minimum 75F. Set screw 736 determines the temperature at which the fan will be turned off. Turning set screw 736 determines the temperature at which the fan will be turned off. Turning set screw 736(low temperature setting) to its fully counterclockwise position sets the low temperature setting to its maxima of 75F. Setting screw 736 to its fully clockwise position sets it to its mininum of 68F. If the high speed mininum is set lower than the low speed maxima, the high speed setting take precedence. Markings about the screws 734, 736 can give the user direction as to the setting temperature. Although, hash marks are shown in the FIG. 4, other types of markings can be used Referring to FIG. 7, occupancy sensing can be activated or turned off using a two-position override toggle type switch 737. Slide switch 737 allows override of the control. Photocell 738 allows the control change to be defeated and inoperable during darkness conditions in the room where the invention is being used Referring to FIG. 7, the operation of time set potentiometer 732 will now be described The time delay in the time set potentometer 732 can be set with a Phillips head screwdriver. Setting the time set 732 fully clockwise will set the time delay at its mininum of 30 seconds. Setting the time set fully clockwise will set the time delay at its maximum of 30 minutes. Setting screw 732 allows the fan to be turned off after preselected delay times(i.e. 30 seconds to 30 minutes) when no motion has been sensed by the invention.

Again referring to FIG. 7, invention 700 can be wire connected through a neutral wire 762, hot wire from the AC Output wire 764 and Controlled Hot to Motor wire 766, which can be color coded, to existing matching wires in the ceiling fan 610 shown in FIG. 6.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the clams here appended.

We claim:

1. A ceiling fan control system for air circulating ceiling fans, comprising in combination:

a ceiling fan attached to a ceiling;

means for switching the ceiling fan to turn on and off;

an occupancy sensor directly connected to the fan for sensing under the fan; and a control means for controlling the occupancy sensor, wherein both the switching means and the control means are directly connected to the fan so that a user can solely rely on the switching means and the control means to operate the ceiling fan.

2. The ceiling fan control system of claim 1, wherein the occupancy sensor includes:

a temperature sensor.

3. The ceiling fan control system of claim 2, further including:

a temperature setting control for operating the ceiling fan being directly attached to the ceiling fan.

4. The ceiling fan control system of claim 1, wherein the occupancy sensor includes:

an optical sensor.

5. The ceiling fan control system of claim 1, wherein the occupancy sensor includes:

a non-ultrasonic sensor.

6. The ceiling fan control system of claim 1, wherein the occupancy sensor includes:

a 360 degree sensing range.

7. The ceiling fan control system of claim 1, wherein the occupancy sensor includes:

a motion sensor.

8. The ceiling fan control system of claim 1, wherein the control means includes:

an on and off switch.

9. The ceiling fan control system of claim 1, wherein the control means includes:

a mechanical switch.

10. A method of operating ceiling fans, comprising the steps of:

installing a ceiling fan on a ceiling;

sensing an occupant under the ceiling fan to activate the ceiling fan;

activating the occupant sensing of the ceiling fan; and adjusting the ceiling fan to control the occupant sensing and the activating of the occupant sensing by directly accessing the ceiling fan.

11. The method of operating ceiling fans of claim 10, wherein the step of adjusting further includes:

controlling the adjusting on the ceiling fan.

12. The method of operating ceiling fans of claim 10, wherein the step of sensing the occupant includes:

optical sensing of the occupant.

13. The method of operating ceiling fans of claim 10, wherein the step of sensing the occupant includes:

temperature sensing of the occupant.

14. The method of operating ceiling fans of claim 10, wherein the step of sensing the occupant includes:

approximate 360 degree sensing for the occupant.

15. The method of operating ceiling fans of claim 10, wherein the step of sensing the occupant includes:

motion sensing of the occupant.

* * * * *